(12) United States Patent
Lange et al.

(10) Patent No.: US 9,424,459 B1
(45) Date of Patent: Aug. 23, 2016

(54) COMPUTERIZED METHODS FOR CELL-BASED PATTERN RECOGNITION

(71) Applicants: Holger Lange, Enger (DE); Joseph Krueger, Boulder, CO (US); G. David Young, Boulder, CO (US); Trevor Johnson, San Diego, CA (US); Frank Voelker, Boulder, CO (US)

(72) Inventors: Holger Lange, Enger (DE); Joseph Krueger, Boulder, CO (US); G. David Young, Boulder, CO (US); Trevor Johnson, San Diego, CA (US); Frank Voelker, Boulder, CO (US)

(73) Assignee: FLAGSHIP BIOSCIENCES, INC., Westminster, CO (US)

( * ) Notice: Subject to any disclaimer, the term of this patent is extended or adjusted under 35 U.S.C. 154(b) by 0 days.

(21) Appl. No.: 14/189,633

(22) Filed: Feb. 25, 2014

Related U.S. Application Data

(60) Provisional application No. 61/769,058, filed on Feb. 25, 2013.

(51) Int. Cl.
*G06K 9/00* (2006.01)
*G06K 9/62* (2006.01)

(52) U.S. Cl.
CPC ............ *G06K 9/0014* (2013.01); *G06K 9/6262* (2013.01)

(58) Field of Classification Search
None
See application file for complete search history.

(56) References Cited

U.S. PATENT DOCUMENTS

| | | | | |
|---|---|---|---|---|
| 8,311,276 B2* | 11/2012 | Kizuki et al. | | 382/103 |
| 2005/0111758 A1* | 5/2005 | Lange et al. | | 382/294 |
| 2009/0286695 A1* | 11/2009 | Cainarca et al. | | 506/10 |
| 2010/0111396 A1* | 5/2010 | Boucheron | | 382/133 |
| 2011/0090500 A1* | 4/2011 | Hu et al. | | 356/337 |
| 2012/0076390 A1* | 3/2012 | Potts et al. | | 382/133 |
| 2013/0064441 A1* | 3/2013 | Kask | | 382/133 |
| 2015/0004630 A1* | 1/2015 | Lange et al. | | 435/7.21 |

\* cited by examiner

*Primary Examiner* — Tahmina Ansari
(74) *Attorney, Agent, or Firm* — Coastal Patent Law Group, P.C.

(57) ABSTRACT

Systems and methods relating to a cell-based pattern recognition tool for microscopy images from tissue sections are described, wherein cell features are extracted and a classifier is built in accordance with a particular application using an interactive training tied to a computerized platform, the result is an application-specific classifier that further processes images in accordance with the specific application, thereby tuning an automated process for cell based pattern recognition.

18 Claims, 6 Drawing Sheets

COMPUTERIZED METHODS FOR CELL-BASED PATTERN RECOGNITION

CROSS-REFERENCE TO RELATED APPLICATIONS

This application claims benefit of priority with U.S. Provisional Ser. No. 61/769,058, filed Feb. 25, 2013, titled "Cell-based Pattern Recognition".

BACKGROUND

1. Field of the Invention

The claimed invention relates generally to systems and methods for computerized medical imaging and analysis; and more particularly, to systems and methods for cell-based pattern recognition and machine learning as applied to microscopy images from tissue sections.

2. Description of the Related Art

Many computerized tissue analysis applications require that the analysis is performed only for cells of certain types, e.g. invasive tumor cells.

A pathologist can outline the regions-of-analysis that only include cells of interest, but this can be very time consuming and impractical when analyzing entire tissue sections.

An automated pattern recognition tool is needed that identifies cells in tissue that are of the type of interest.

The performance of a pattern recognition tool depends on its feature set. Pattern recognition tools that use general-purpose pixel-based feature sets can be used in a wide variety of applications. However these provide in many cases, only a sub-optimal performance for any particular application.

Different types of tissue have different looking cells and each cell compartment can be stained with different colors depending on the application. Any tissue analysis is therefore highly specific to its particular application.

The best feature set to identify cells of a certain type should be based on a characterization of the cells, which needs to be optimized for any particular application. However, conventional systems and methods have yet to apply such a feature set to yield a functional automated pattern recognition tool.

SUMMARY OF THE INVENTION

The performance limitations of conventional pattern recognition tools using general-purpose pixel-based feature sets for microscopy images of tissue sections can be overcome by using application-specific cell-based feature sets and providing a classification at the cell-level.

In an embodiment, a method for cell based pattern recognition is incorporated into a computerized platform, the method includes: using a computer coupled to a database containing a plurality of images of biological tissue sections, calling up one or more first images of said plurality of digital images for analysis; for said first images: executing a feature extraction algorithm, said feature extraction algorithm configured to detect cells within said first images and analyze one or more cell features thereof; and performing an interactive classifier learning algorithm, said interactive classifier learning algorithm configured to create an application-specific classifier based on interactive user annotations of said cell features of the first images; and for one or more second images of said plurality of digital images: executing the feature extraction algorithm to detect cells within the second images and analyze one or more cell features thereof; and executing an automated classification algorithm, said automated classification algorithm being configured to characterize the cells and cell features of the second images using the application-specific classifier.

Other features and embodiments are herein described in the appended detailed description of the embodiments and the claims.

BRIEF DESCRIPTION OF THE DRAWINGS

The preferred embodiments are herein described with reference to the following figures, wherein.

DETAILED DESCRIPTION OF PREFERRED EMBODIMENTS

Figure 1:
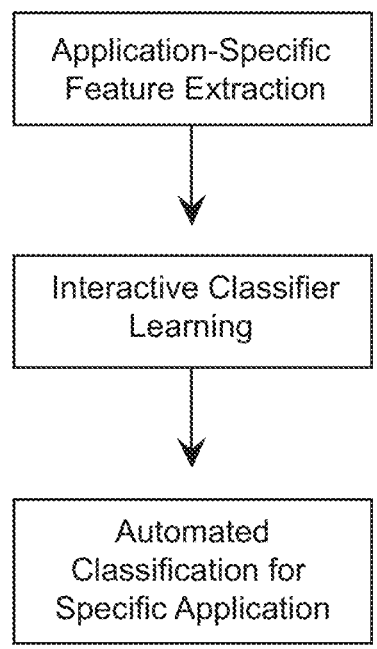
FIG. 1 illustrates a method for cell-based pattern recognition.

In the following description, for purposes of explanation and not limitation, details and descriptions are set forth in order to provide a thorough understanding of the embodiments. However, it will be apparent to those skilled in the art that the claimed invention may be practiced in other embodiments that depart from the following details and descriptions. Thus, it should be understood that the following descriptions shall not be construed as limiting the spirit and scope of the invention as set forth in the appended claims.

A key to building a high-performance pattern recognition tool for microscopy images of tissue sections is to customize the feature extraction to each particular application and provide the classification based on cell specific features at the cell-level.

In the embodiments described herein, computerized pattern recognition tools are based on a feature extraction process, an interactive classifier-learning process, and automated classification process. Each of these individual portions collectively define a method for cell-based pattern recognition, which is an improvement over conventional pattern recognition tools. Moreover, a device such as a computer being programmed to acquire microscopy images and process the images in accordance with the method for cell-based pattern recognition described herein can be referred to as a system configured for cell-based pattern recognition.

The feature extraction process includes the detection of cells and the calculation of cell features that will be subsequently used for the classification of the cells. The detection of cells needs to be application-specific to: the tissue type, for example, round cells in breast tissue vs. elongated cells in gastrointestinal tissue; the cell compartments being stained, for example, nucleus, membrane and cytoplasm; and the staining chromogen, for example Hematoxylin, Eosin, DAB.

The cell features to be calculated should also be application-specific and may include, but should not be limited to one or more of:

characterization of the cell morphology (e.g. area of the nucleus);

characterization of the staining (e.g. mean optical density of DAB staining on the nucleus); and characterization of the cell neighborhood (e.g. nuclei profile surface density, which means the percentage of the area in the neighborhood of a cell that is covered with nuclei).

Once the cell-features are identified, those features must be classified as pertinent or non-pertinent to the analysis being performed. The classification of these cells is automated, but first the automated classification must be fine-tuned for the specific analysis being performed.

The classifier-learning process is an interactive program that creates a classifier from examples provided by a user. The classifier uses the cell features and provides a classification at the cell-level. The user defines the number of different cell types of interest and then identifies examples of cells that are representative for those cell types. The program trains a classifier based on those examples using supervised machine learning techniques and displays the cell classification results based on the current classifier. Pattern recognition at the cell-level with pre-calculated cell features is very fast. This process, where a user provides the examples, allows the classifier to be updated while the updated classification results are displayed can be very responsive. The pattern recognition tool can use any classification algorithm that supports supervised learning. Standard classification algorithms and their derivatives or a combination of them can be used, which include, but are not limited to: Bayes classifier, k-nearest neighbor, maximum entropy classifier, Markov models, support vector machines, gene expression programming, neural networks and decision trees.

Because each application will have distinct cell features that may be pertinent or non-pertinent to a given analysis, it should be understood that the specifics can be varied according to any desired application. However, only limited experimentation will be required to fine tune the specific inputs and annotations for each specific application.

Now turning to the drawings, FIG. 1 shows a method for cell-based pattern recognition in accordance with an embodiment. The method includes an application-specific feature extraction, wherein cell-based features are detected. Subsequent to the feature extraction, an interactive learning classifier is developed as a practitioner annotates a particular specimen image to identify and classify various cell-based features as pertinent or non-pertinent. With the interactive classifier being developed, the system can now run an automated classification based on the specific application.

Once developed, the interactive learning classifier can saved to memory and stored for future use. Additionally, the classifier can be called up for further identification and tuning by a practitioner, for example to train the system for an application using a unique set of tissue specimen images.

Figure 2:
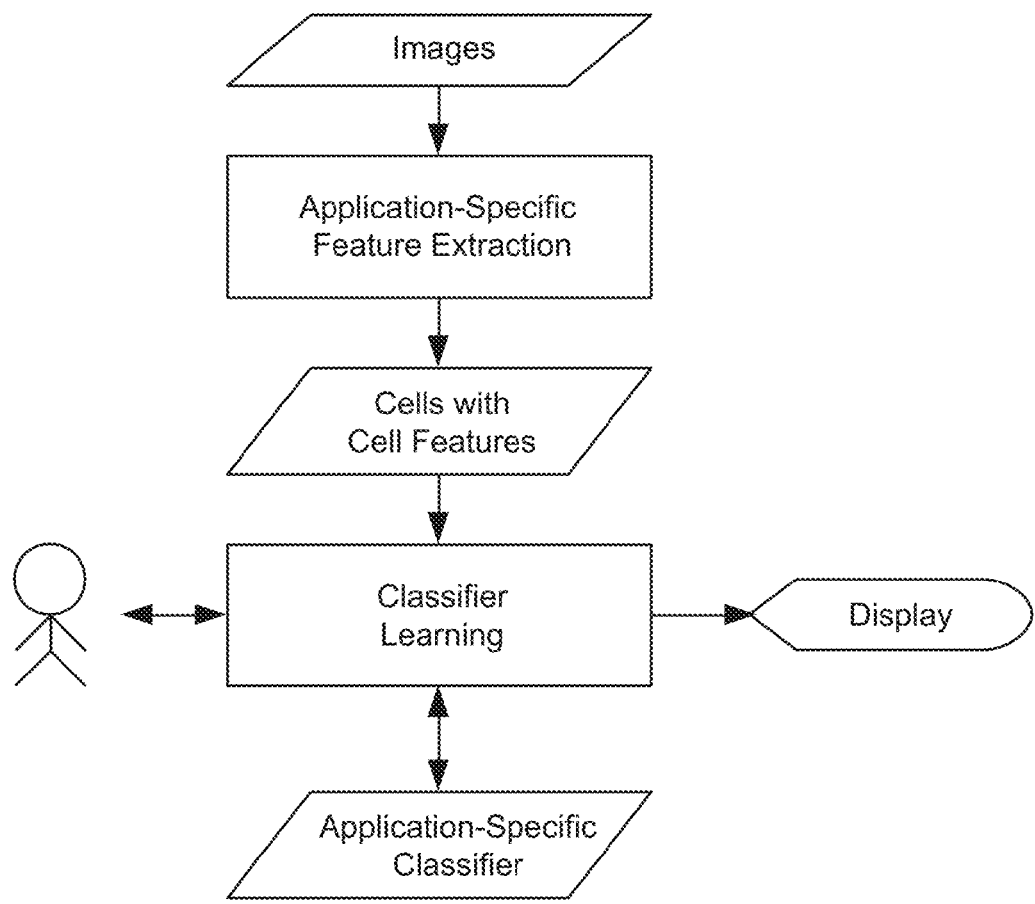
FIG. 2 shows the interactive classifier-learning process according to the method illustrated in FIG. 1.

FIG. 2 shows the classifier-learning process from the loading of images to the creation of an application-specific classifier. The first step is the application-specific feature extraction that detects the cells and calculates their features, this can be an automated cell feature algorithm performed for one or more section images of a tissue sample volume. The second step is the classifier learning, an interactive process, where a user provides examples of the different cell types and the program creates an application-specific classifier based on those examples.

The classification program provides a classification of the cells by applying the classifier on cell features. Note that the feature extraction program and the classifiers created by the classifier learning program are application-specific. The compatibility of the cells provided by the feature extraction program and the classifier are verified by the classification program.

Figure 3:
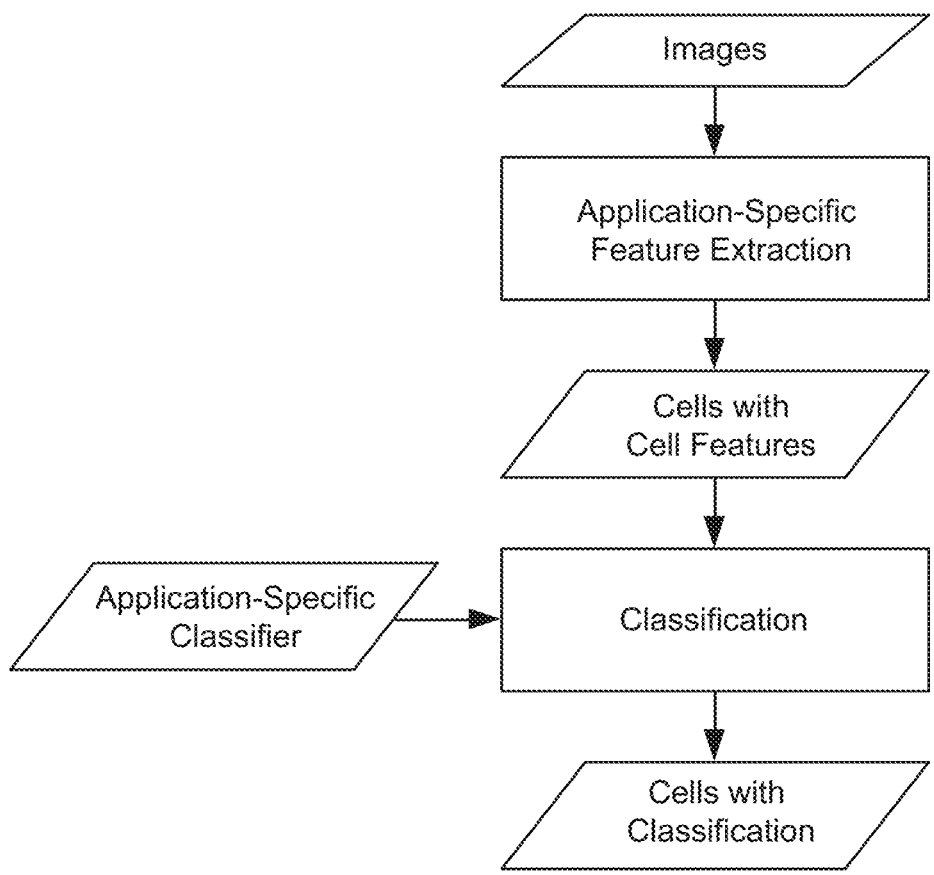
FIG. 3 shows the automated classification process according to the method illustrated in FIG. 1.

FIG. 3 shows the classification process from the loading of images in the system to the classified cells. The first step is the same as for the classifier learning, the application-specific feature extraction that detects the cells and calculates cell features. The second step is the classification of cells using the application-specific classifier created by the classifier learning program on cell features.

A critical problem for a pattern recognition tool for microscopy images of tissue sections is that cells can look considerably different in tissue samples from different origins (e.g. breast tumor nuclei sizes in different patients). Therefore a calibration step is part of the classifier learning and the classification.

The calibration method and parameters can be hard-coded (e.g. program measures the mean nuclei diameter of all nuclei in the entire tissue section and then uses it to normalize all nuclei size measurements used for the classification), assisted by a user (e.g. user outlines tumor nuclei in the tissue section and then the program measures the mean nuclei diameter of those tumor nuclei and uses it to normalize all nuclei size measurements used for the classification), and/or automatically determined by the classifier learning when using tissue sections from different origins and then automatically applied by the classification (e.g. classifier learning determines that the means of the tumor nuclei size distributions vary between tissue sections from different origins and a mean value normalization is applied).

To provide a responsive pattern recognition tool, one embodiment can include applying the systems and methods to build responsive image analysis tools as described in commonly owned and co-pending U.S. Ser. No. 14/052,773, filed Oct. 14, 2013, the contents of which are hereby incorporated by reference. As the pattern recognition tool is already cell-based, it fits nicely into the suggested framework. The feature extraction can be part of a low-level image analysis program that is executed automatically by the system. The classifier-learning would be part of an interactive high-level image analysis program that would be operated by a user. The separation of the heavy processing feature extraction from the classifier-learning and a classification at the cell-level provide the basis for the implementation of a highly interactive and responsive classifier-learning program. The classification does not require any user interactions and could therefore be part of the low-level image analysis program. However given its dependency on the classifier, it would be better implemented as part of a high-level image analysis program that is either executed automatically by the system or by a user depending on the interactions required.

The cell-based pattern recognition approach can be integrated with pixel-based and/or region-based pattern recognition approaches. The integration with pixel-based approaches is desirable when regions need to be included in the analysis, which are not part of the detected cells. The integration with region-based approaches is desirable when the region-level features are important for the classification of the cells (e.g. invasive tumor vs. carcinoma in situ). A region representation of the cells provides a convenient data structure for this integration.

In one example, systems and methods are described using a simple application, the identification of tumor cells in breast tissue when using progesterone receptors staining. The slides are stained with DAB (brown) for the quantification of the progesterone receptors in the nuclei and stained with Hematoxylin (blue) to identify the nuclei. Note that in this application the nucleus is the only cell compartment that is stained.

Figure 4:
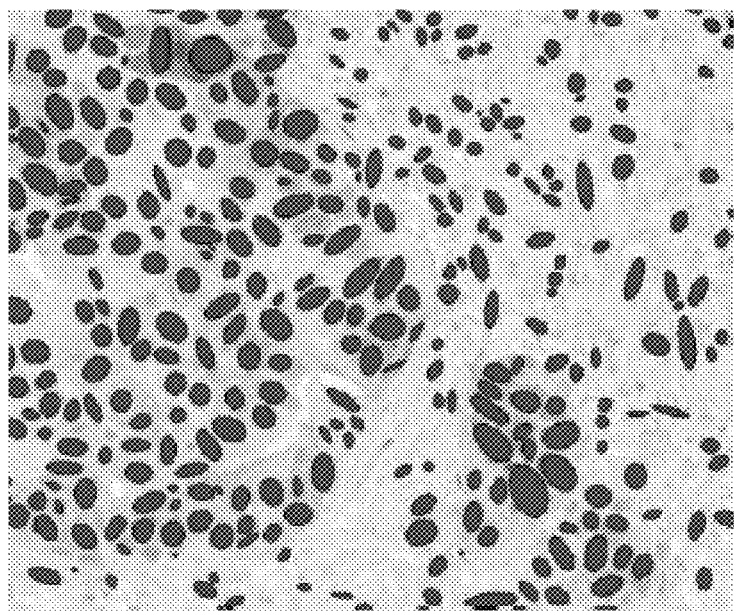
FIG. 4 is an image showing cells detected by the application-specific feature extraction program in accordance with one example including the identification of tumor cells in breast tissue when using progesterone receptors staining.

The application-specific feature extraction program is optimized to detect the nuclei based on the Hematoxylin and DAB staining and the specific morphology of the nuclei in breast tissue. The cell detection was already part of the tissue analysis application that provides the quantification of progesterone receptors in breast tissue. For the classification of the cells, only the calculation of additional cell features needed to be implemented. FIG. 4 shows the nuclei detected by the feature extraction program.

The classifier learning program was set up for two different cell types, tumor cells and non-tumor cells. A user identifies representative examples of the nuclei belonging to tumor cells and non-tumor cells. The program provides an updated display of the classification results as more or updated examples are provided. A very simple gating classification algorithm was used for this illustration. Basically, the algorithm determines the significant features that allow distinguishing between the different cell types based on minimum and maximum thresholds and determines these thresholds.

This interactive program is very responsive as the learning and classification is done at the cell-level (vs. the pixel-level) and the cell features are already pre-calculated.

Figure 5:
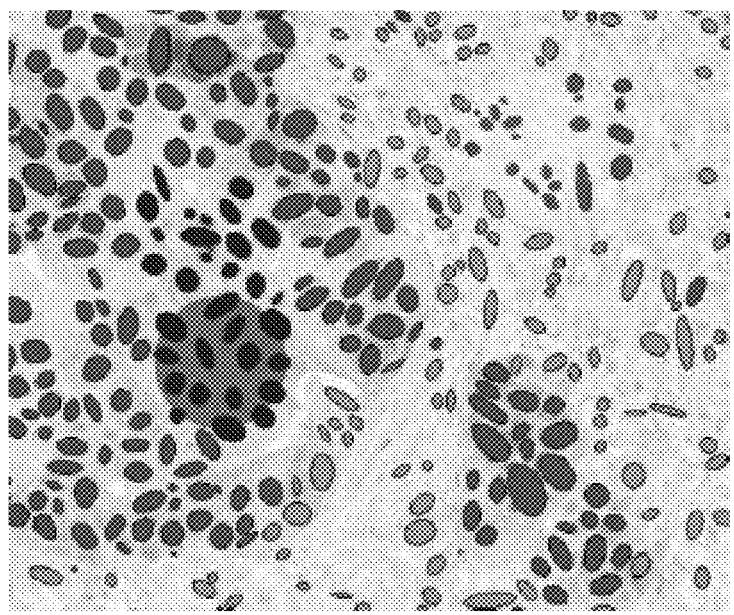
FIG. 5 is an image showing cells of different cell types during the interactive classifier-learning process in accordance with the referenced example.

FIG. 5 shows the nuclei of the different cell types of interest during classifier-learning. The large light blue circle shows the actual position of the painting tool that allows the user to identify the nuclei of tumor cells. The dark blue coloring of a nucleus shows that the nucleus has been identified by the user as a nucleus of a tumor cell. The medium blue coloring of a nucleus shows that it has been classified by the current classifier as a nucleus of a tumor cell. The large light green circle shows the actual position of the painting tool that allows the user to identify the nuclei of non-tumor cells. The dark green coloring of a nucleus shows that the nucleus has been identified by the user as a nucleus of a non-tumor cell. The medium green coloring of a nucleus shows that it has been classified by the current classifier as a nucleus of a non-tumor cell.

Figure 6:
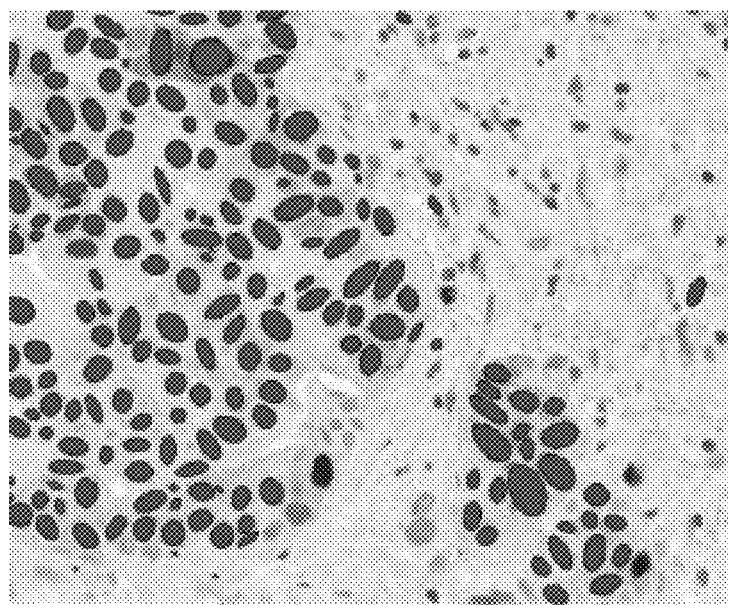
FIG. 6 is an image showing cells classified by the automated classification process in the referenced example.

The classification program has been configured to only use the tumor cells for the tissue analysis. The classifier provided by this example actually used only a single cell feature, the nuclei profile surface density and determined a threshold of 25% to distinguish between tumor cells and non-tumor cells. Equivalent results using general-purpose pixel-based pattern recognition tools would have required more features and more complex classification algorithms. FIG. 6 shows the nuclei in blue that were classified as nuclei of tumor cells.

What is claimed is:

1. A computerized method for cell-based pattern recognition, comprising:
 using a computer coupled to a database containing a plurality of images of biological tissue sections, calling up one or more first images of said plurality of digital images for analysis;
 with said first images:
  executing a feature extraction algorithm, said feature extraction algorithm configured to detect cells within said first images and analyze one or more cell features thereof; and
  performing an interactive classifier learning algorithm, said interactive classifier learning algorithm creating an application-specific classifier based on interactive user annotations of said cell features of the first images; and
 with one or more second images of said plurality of digital images:
  executing the feature extraction algorithm to detect cells within the second images and analyze one or more cell features thereof; and
  executing an automated classification algorithm, said automated classification algorithm being configured to characterize the cells and cell features of the second images using the application-specific classifier;
 the method further comprising:
  in a calibration step, adjusting the application-specific classifier for variations in cell features from images of distinct biological specimens.

2. The method of claim 1, wherein said cell features includes a characterization of the cell morphology.

3. The method of claim 1, wherein said cell features includes a characterization of staining used to stain cells within the images.

4. The method of claim 1, wherein said cell features includes a characterization of the cell neighborhood.

5. The method of claim 1, wherein said calibration step is: hard-coded in the interactive classifier learning algorithm, assisted by a user, automated, or a combination thereof.

6. The method of claim 1, wherein said interactive classifier learning algorithm is configured to use Bayes classifiers for supervised learning.

7. The method of claim 1, wherein said interactive classifier learning algorithm is configured to use a k-nearest neighborhood algorithm for supervised learning.

8. The method of claim 1, wherein said interactive classifier learning algorithm is configured to use a maximum entropy classifier for supervised learning.

9. The method of claim 1, wherein said interactive classifier learning algorithm is configured to use Markov models for supervised learning.

10. The method of claim 1, wherein said interactive classifier learning algorithm is configured to use support vector machines for supervised learning.

11. The method of claim 1, wherein said interactive classifier learning algorithm is configured to use gene expression programming for supervised learning.

12. The method of claim 1, wherein said interactive classifier learning algorithm is configured to use neural networks for supervised learning.

13. The method of claim 1, wherein said interactive classifier learning algorithm is configured to use decision trees for supervised learning.

14. The method of claim 1, wherein said cell-based pattern recognition tool is integrated with a pixel-based pattern recognition tool.

15. The method of claim 1, wherein said cell-based pattern recognition tool is integrated with a region-based pattern recognition tool.

16. The method of claim 1, wherein said feature extraction algorithm is executed for two or more images of the plurality of images.

17. The method of claim 1, wherein said automated classification algorithm is executed for two or more images of the plurality of images.

18. A system comprising a computer and a display coupled to a database containing a plurality of images of biological tissue sections, said system being configured to perform the method of claim 1.

* * * * *